US011906938B2

(12) United States Patent
Klopfenstein

(10) Patent No.: US 11,906,938 B2
(45) Date of Patent: Feb. 20, 2024

(54) METHOD FOR PERMUTATION OF THE TIME DISPLAY MODE OF AN ELECTRONIC WATCH WITH AN ANALOGUE DISPLAY, AND THE ASSOCIATED WATCH

(71) Applicant: ETA SA Manufacture Horlogere Suisse, Grenchen (CH)

(72) Inventor: Francois Klopfenstein, Delemont (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 1273 days.

(21) Appl. No.: 16/454,246

(22) Filed: Jun. 27, 2019

(65) Prior Publication Data

US 2020/0033814 A1 Jan. 30, 2020

(51) Int. Cl.
*G04G 9/00* (2006.01)
*G04B 19/23* (2006.01)
*G04B 27/00* (2006.01)

(52) U.S. Cl.
CPC ........... *G04G 9/0076* (2013.01); *G04B 19/23* (2013.01); *G04B 27/00* (2013.01)

(58) Field of Classification Search
CPC ...... G04B 19/23; G04B 19/235; G04B 27/00; G04G 9/0076
See application file for complete search history.

(56) References Cited

U.S. PATENT DOCUMENTS 2,305,508 A * 12/1942 Woodruff ............... G04B 19/23 368/21
3,503,203 A * 3/1970 Gruner ................... G04B 27/00 368/21
3,633,354 A * 1/1972 Stemmler ............ G04B 19/235 968/168

(Continued)

FOREIGN PATENT DOCUMENTS

CH 700 664 A2 9/2010
CN 2162667 Y 4/1994

(Continued)

OTHER PUBLICATIONS

Combined Chinese Office Action and Search Report dated Oct. 19, 2020, in Chinese Patent Appplicaiton No. 201910679300.X (with English translation), citing documents AM-AV therein, 9 pages.

(Continued)

*Primary Examiner* — Daniel P Wicklund
(74) *Attorney, Agent, or Firm* — Oblon, McClelland, Maier & Neustadt, L.L.P.

(57) ABSTRACT

A method for permutation of a time display mode of an electronic watch with an analogue display, including, after manipulation of a control member of the watch, a permutation of the position of main time indicating means of the watch, such that the device changes from indicating a first time to indicating a second time, the position of secondary time indicating device of the watch, such that the device changes from indicating the second time to indicating the (Continued)

first time, the position of an analogue time display mode indicator of the watch, such that the indicator changes from a first position characteristic of the first mode to a second position characteristic of the second mode.

13 Claims, 1 Drawing Sheet

(56) References Cited

U.S. PATENT DOCUMENTS

| | | | | | |
|---|---|---|---|---|---|
| 4,717,260 | A * | 1/1988 | Tsuji | G04B 19/223 368/21 |
| 4,847,819 | A * | 7/1989 | Hong | G04B 19/223 968/231 |
| 4,945,521 | A * | 7/1990 | Klaus | G04B 19/235 368/185 |
| 5,631,878 | A * | 5/1997 | Chen | G04B 19/223 368/21 |
| 9,104,180 | B2 | 8/2015 | Springer | |
| 10,042,329 | B2 | 8/2018 | Akiyama | |
| 2005/0180265 | A1* | 8/2005 | Van Selst | G04G 9/0076 368/21 |
| 2006/0140056 | A1* | 6/2006 | Lizzi | G04B 19/23 368/21 |
| 2006/0171256 | A1* | 8/2006 | Herbert | G04C 17/0058 368/21 |
| 2008/0198696 | A1* | 8/2008 | Dias | G04B 19/235 368/27 |
| 2010/0091615 | A1* | 4/2010 | Scott | G04G 9/0076 368/21 |
| 2011/0032802 | A1* | 2/2011 | Muller | G04B 19/23 368/22 |
| 2013/0322218 | A1* | 12/2013 | Burkhardt | G04C 17/005 368/22 |
| 2014/0086022 | A1* | 3/2014 | Matsuzaki | G04R 20/04 368/47 |
| 2017/0038744 | A1* | 2/2017 | Fujisawa | H01Q 9/0407 |
| 2017/0060098 | A1* | 3/2017 | Yonekura | G04R 20/30 |
| 2017/0115632 | A1* | 4/2017 | Matsuno | G04B 47/068 |
| 2017/0364030 | A1* | 12/2017 | Hasegawa | G04B 19/223 |

FOREIGN PATENT DOCUMENTS

| | | | |
|---|---|---|---|
| CN | 1159232 | A | 9/1997 |
| CN | 1350214 | A | 5/2002 |
| CN | 101663624 | A | 3/2010 |
| CN | 202677074 | U | 1/2013 |
| CN | 205038445 | U | 2/2016 |
| EP | 2 008 159 | B1 | 6/2010 |
| EP | 2 021 880 | B1 | 10/2010 |
| EP | 2 362 277 | A1 | 8/2011 |
| JP | 3-13885 | A | 1/1991 |
| JP | 2017-173047 | A | 9/2017 |
| KR | 10-2013-0021327 | A | 3/2013 |
| WO | WO 2009/121699 | A1 | 10/2009 |

OTHER PUBLICATIONS

European Search Rerport dated Feb. 4, 2019 in European Application 18185710.3, filed on Jul. 26, 2018 (with English Translation of Categories of Cited Documents).

Indian Office Action dated Oct. 19, 2020 in Indian Patent Application No. 10-2019-0088542 (with English translation). citing documents AO, AP and AQ therein, 12 pages.

* cited by examiner

METHOD FOR PERMUTATION OF THE TIME DISPLAY MODE OF AN ELECTRONIC WATCH WITH AN ANALOGUE DISPLAY, AND THE ASSOCIATED WATCH

CROSS-REFERENCE TO RELATED APPLICATION

This application claims priority to European Patent Application No. 18185710.3 filed on Jul. 26, 2018, the entire disclosure of which is hereby incorporated herein by reference.

FIELD OF THE INVENTION

The invention relates to a method for permutation of the time display mode of an electronic watch with an analogue display, and the associated watch.

BACKGROUND OF THE INVENTION

European Patent No. EP 2021880B1 is known, which discloses a watch making it possible to temporarily display the time in another time zone and automatically return to the initial time zone. The seconds hand is then used to point to a city associated with the time zone whose time is displayed. One drawback is that it is necessary to disturb the time display of the watch if the user wishes the time in the other time zone to remain displayed.

European Patent documents EP 2362277A1 and EP 2008159B1 disclose watches allowing the selective display of the time in one or other of two time zones. The time zone whose time is displayed is indicated in an aperture in the case of EP Patent Application No. 2362277A1, and by means of a dedicated hand in the case of EP Patent No. 2008159B1. One drawback is that it is not possible to simultaneously display the time in both time zones.

SUMMARY OF THE INVENTION

It is an object of the present invention to at least partly overcome the aforementioned drawbacks.

To this end, according to a first aspect, the invention relates to a method for permutation of a time display mode of an electronic watch with an analogue display, comprising, after manipulation of a control member of the watch, a permutation of:

- the position of the main time indicating means of the watch, such that it changes from indicating a first time to indicating a second time,
- the position of secondary time indicating means of the watch, such that it changes from indicating the second time to indicating the first time,
- the position of an analogue time display mode indicator of the watch, such that it changes from a first position characteristic of the first mode to a second position characteristic of the second mode.

According to the invention, it is possible to simultaneously display a first time (advantageously the time in a first time zone) and a second time (advantageously the time in a second time zone), as long as the actuating means is not manipulated. The first time is displayed by the main time indicating means, while the second time is displayed by the secondary time indicating means. When the actuating means is manipulated, both times remain simultaneously displayed, but by the time indicating means which are inverted: the first time is then displayed by the secondary time indicating means, while the second time is displayed by the main time indicating means. The analogue indicator makes it possible to indicate which time is displayed on which time indicating means. If the indicator is in the position characteristic of the first mode, this means that the main time indicating means is displaying the first time. Conversely, if the indicator is in the position characteristic of the second mode, this means that the main time indicating means is displaying the second time. The indicator is advantageously a hand, pointing in a first direction to indicate the first mode, and pointing in a second direction to indicate the second mode.

In a non-limiting embodiment, following an initial actuation of the control member performed in a short interval preceding the manipulation, the method includes placing the indicator in the first position characteristic of the first mode, from a first operating position of the indicator.

According to this embodiment, the indicator is not dedicated to indicating the time displayed by the main means. It only has this function following an initial actuation of the control member. Thus, before the initial actuation, it is in a first operating position. The indicator is, for example, the seconds hand, and the first operating position is the position of the seconds hand at the moment of initial actuation of the control member.

Further, advantageously, following permutation of the position of the analogue indicator, the method comprises placing the indicator in a second operating position, from the second position characteristic of the second mode.

Following indication of the second mode by the indicator, the indicator is returned to a second operating position, which advantageously corresponds to the current second if the indicator is the seconds hand.

In a non-limiting embodiment, the first time and the second time correspond to the times of two different time zones.

According to a second aspect, the invention relates to an electronic watch with an analogue display, allowing permutation of a time display mode, including:

- Main time indicating means
- Secondary time indicating means
- A time display mode indicator
- A control member configured such that manipulation of the control member permutates:
  - the position of the main time indicating means such that it changes from indicating a first time to indicating a second time,
  - the position of secondary time indicating means such that it changes from indicating the second time to indicating the first time,
  - the position of the indicator such that it changes from a first position characteristic of the first mode to a second position characteristic of the second mode.

In a non-limiting embodiment, the control member is configured such that an initial actuation of the control member, performed in a short interval preceding the manipulation, places the indicator in the first position characteristic of the first mode, from a first operating position of the indicator.

In a non-limiting embodiment, following permutation of the indicator's position, the control member is configured to place the indicator in a second operating position, from the second position characteristic of the second mode.

In a non-limiting embodiment, the indicator is the seconds hand, temporarily assigned to indicating the time display mode following the initial actuation of the control member.

In a non-limiting embodiment, the indicator is dedicated to indicating the time display mode.

In such case, the indicator has only two positions: the first position indicating the first mode, or the second position indicating the second mode. The indicator has no other functions.

Further, advantageously, the indicator is a hand.

In such case, the hand points in a first direction to indicate the first mode, and points in a second direction to indicate the second mode.

Alternatively, the indicator is a disc, one portion of which is visible underneath an aperture of the watch.

In such case, the disc has two portions, one or other of which may be visible through the aperture, each portion including a symbol representative of one of the modes.

In a non-limiting embodiment, the main time indicating means is an hour hand and a minute hand, and the second time indicating means is a GMT hand.

In a non-limiting embodiment, the first time and the second time correspond to the times of two different time zones.

In a non-limiting embodiment, the watch includes a date display configured to display the date in the time zone whose time is displayed by the main time indicating means.

Indeed, the change of time zone can cause the date to change. It is therefore important for the date display to be synchronised with the date of the time zone whose time is displayed by the main time indicating means.

In a non-limiting embodiment, the control member is a crown with at least two axial positions.

Manipulation of the control member can consist of a short press on the crown.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
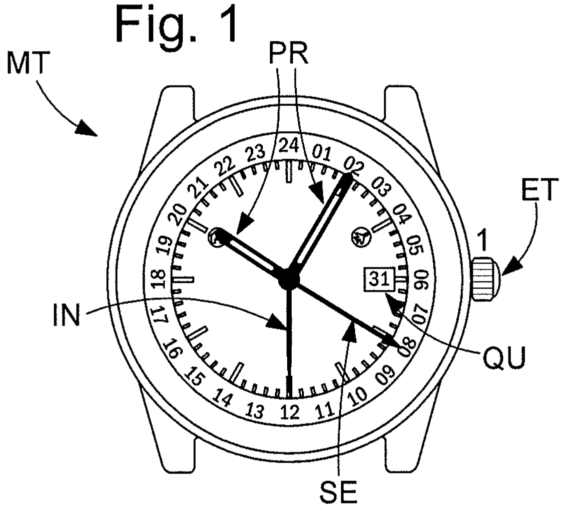
FIG. 1 schematically represents an electronic watch according to one embodiment of the invention.

The invention relates to an electronic watch MT with an analogue display, as represented in FIG. 1. Watch MT includes:

- Main time indicating means PR, including an hour hand and a minute hand. Main time indicating means PR initially indicates the time in a first time zone.
- Secondary time indicating means SE, including a GMT (Greenwich Mean Time) hand. It is noted that, in horology, the acronym GMT is used to refer to watches which indicate a second time zone on the dial, by means of an additional hour hand, namely the exact time of a city located in another time zone, which may not necessarily be that of Greenwich. The secondary time indicating means SE initially indicates the time in a second time zone.
- A time display mode indicator IN. A first time display mode corresponds to the following situation: main time indicating means PR indicates the time in the first time zone, and secondary time indicating means SE indicates the time in the second time zone. Conversely, a second time display mode corresponds to the following situation: main time indicating means PR indicates the time in the second time zone, and secondary time indicating means SE indicates the time in the first time zone. In a first embodiment represented in FIG. 1, indicator IN does not simply perform the time mode indicating function, but also performs another function. In such case, indicator IN is advantageously the seconds hand, and occasionally said seconds hand is assigned to indicating the time display mode, as is explained hereinafter. In a second embodiment that is not represented, the indicator is dedicated to indicating the time display mode and performs only that function. In such case, the indicator is, for example, a dedicated hand or a disc of which one portion is visible underneath an aperture.
- A control member ET, manipulation of which causes the movement of main time indicating means PR, of secondary time indicating means SE and of time display mode indicator IN. Control member ET is advantageously a crown with at least two axial positions; in this case manipulating the control member consists of a short press on the crown.

Figure 2:
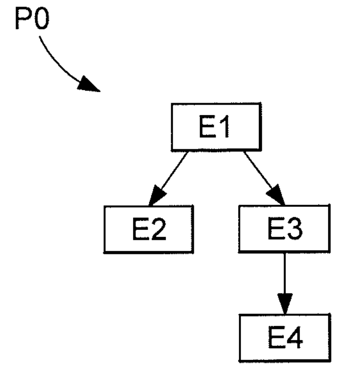
FIG. 2 represents the steps of a method for permutation of the time display mode of the watch of FIG. 1, according to one embodiment of the invention.

The invention also relates to a method PO for permutation of the time display mode of the watch MT described above, the first embodiment of which (time display mode indicator IN is the seconds hand) is described below with reference to FIG. 2 and the subsequent Figures.

As explained previously, watch MT is initially in the first display mode: main time indicating means PR indicates the time in the first time zone, and secondary time indicating means SE indicates the time in the second time zone. In the example represented in FIG. 1 showing the initial state of watch MT, the time in the first time zone is 10:05 and the time in the second time zone is 8:05. Since time display mode indicator IN is the seconds hand, it initially displays the current second, and is said to be in a first operating position.

Figure 3:
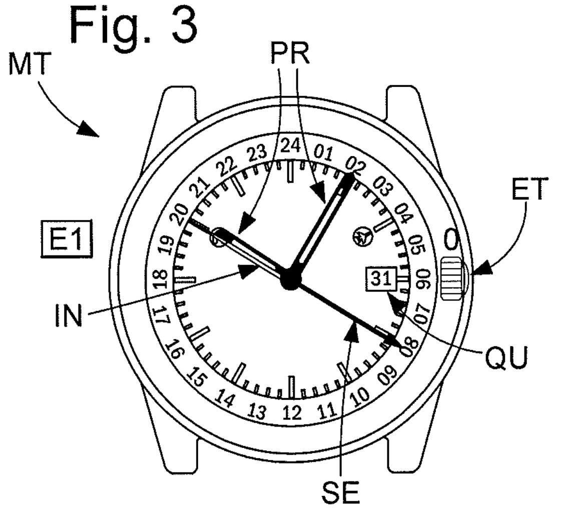
FIG. 3 represents the watch of FIG. 1, following an initial actuation of the crown, according to one embodiment of the invention.

Referring to FIG. 3, in a step E1, control member ET is subjected to an initial actuation (in the example described, this means that the crown is subjected to a first short press). Indicator IN then moves temporarily into a first position (here, it moves to 10 o'clock) to indicate that watch MT is initially in the first display mode.

Figure 4:
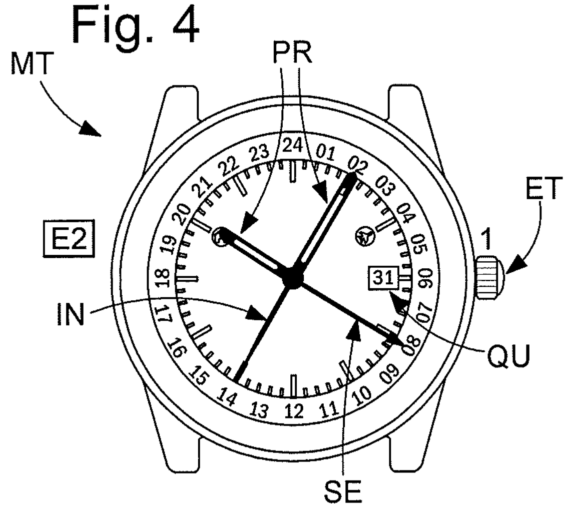
FIG. 4 represents the watch of FIG. 1, when the initial actuation is not followed by a subsequent manipulation of the crown, according to one embodiment of the invention.

Referring to FIG. 4, in a step E2, if control member ET is not subjected to any further manipulation (here, a second short press) within a certain time, for example 5 seconds, then indicator IN returns to its function of indicating the seconds and takes a second operating position in which it advantageously indicates the current second.

Figure 5:
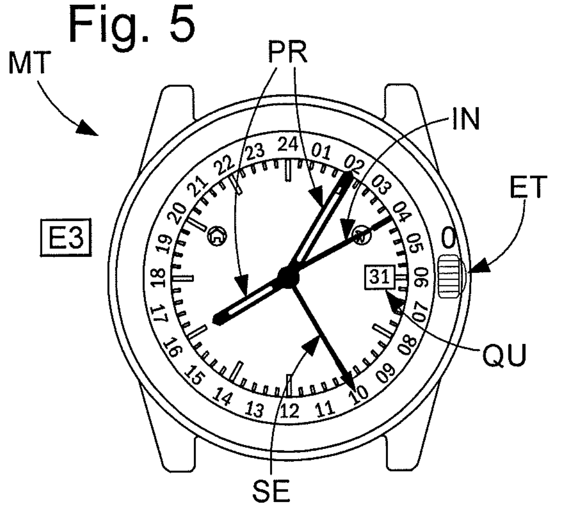
FIG. 5 represents the watch of FIG. 1, after a manipulation of the crown following the initial actuation, according to one embodiment of the invention.

Referring to FIG. 5, in a step E3, if conversely, control member ET is subjected to a subsequent manipulation (here a second short press) within the certain time, then there are permutations of:

- the position of main time indicating means PR of watch MT, such that it changes from indicating the time in the first time zone to indicating the time in the second time zone. In the example represented, main time indicating means PR henceforth displays 8:05.

the position of secondary time indicating means SE of watch MT, such that it changes from indicating the time in the second time zone to indicating the time in the first time zone. In the example represented, secondary time indicating means SE henceforth displays 10:05.

the position of time display mode indicator IN of watch MT, such that it changes from the first position characteristic of the first mode to the second position characteristic of the second mode. In the example represented, the seconds hand moves to 2 o'clock.

Advantageously, the permutations can immediately be cancelled by another manipulation of control member ET (here by a third short press on the crown).

It is noted that it is possible for watch MT to include a date display QU and for the date associated with main time indicating means PR to change after the permutations. It is thus important for date display QU always to follow the time zone displayed by main time indicating means PR.

Figure 6:
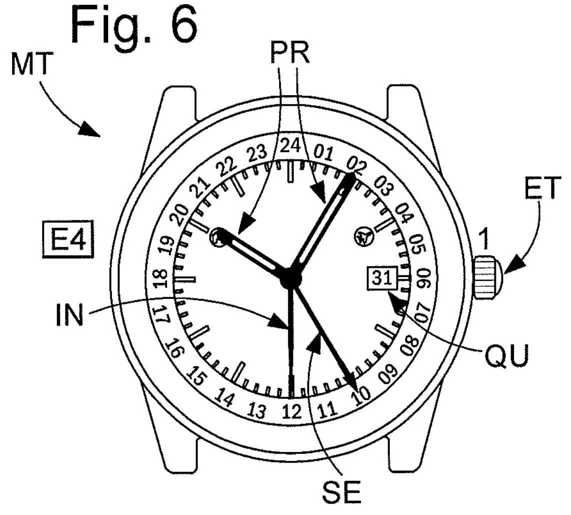
FIG. 6 represents the watch of FIG. 1, within a certain time after the manipulation, according to one embodiment of the invention.

Referring to FIG. 6, in a step E4 occurring within a certain time after step E3 (for example 5 seconds), display mode indicator IN returns to its seconds indicating function and is thus positioned in a second operating position again in which it indicates the current second.

In the second embodiment of the method, the indicator is dedicated to indicating the time display mode. In such case, only step E3 occurs when control member ET is manipulated.

Of course, this invention is not limited to the illustrated example but is capable of various variants and alterations that will appear to those skilled in the art.

The invention claimed is:

1. A method for permutation of a time display mode of an electronic watch with an analogue display, comprising, after manipulation of a control member of the watch, a permutation of:

a position of a main time indicating means of the watch, said main time indicating means including an hour hand and a minute hand that are configured rotate around an axis, such that said main time indicating means changes from indicating a first time to indicating a second time, a position of a secondary time indicating means of the watch, said secondary time means including a secondary hand that is configured to rotate around the axis, such that said secondary time indicating means changes from indicating the second time to indicating the first time, a position of an analogue time display mode indicator of the watch, said analogue time display mode indicator including an indicator hand that is configured to rotate around the axis, such that said analogue time display mode indicator moves to a first position to match the hour hand of the main time indicating means when the watch is in a first mode and said analogue time display mode indicator moves to a second position when the watch is in a second mode.

2. The method according to claim 1, comprising performing an initial actuation of the control member in a short interval preceding the manipulation places the analogue time display mode indicator in the first position from a first operating position of the analogue time display mode indicator.

3. The method according to claim 1, wherein the second position of the analogue time display mode indicator is the 2 o'clock position to indicate that the watch is in the second mode.

4. The method according to claim 1, wherein the first time and the second time correspond to times of two different time zones.

5. An electronic watch with an analogue display, allowing permutation of a time display mode, comprising:

a main time indicating means including an hour hand and a minute hand that are configured rotate around an axis;

a second time indicating means including a secondary hand that is configured to rotate around the axis;

a time display mode indicator including an indicator hand that is configured to rotate around the axis; and a control member configured such that manipulation of the control member permutates:

a position of the main time indicating means such that said main time indicating means changes from indicating a first time to indicating a second time, a position of the secondary time indicating means such that said secondary time indicating means changes from indicating the second time to indicating the first time, a position of the time display mode indicator such that said time display mode indicator moves to a first position to match the hour hand of the main time indicating means when the electronic watch is in a first mode and said time display mode indicator moves to a second position when the electronic watch is in a second mode.

6. The electronic watch according to claim 5, wherein the control member is configured such that an initial actuation of the control member, performed in a short interval preceding the manipulation, places the time display mode indicator in the first position from a first operating position of the time display mode indicator.

7. The electronic watch according to claim 5, wherein the second position of the time display mode indicator is the 2 o'clock position to indicate that the electronic watch is in the second mode.

8. The electronic watch according to claim 7, wherein the time display mode indicator is the seconds hand, temporarily assigned to indicating the time display mode following the initial actuation of the control member.

9. The electronic watch according to claim 5, wherein the time display mode indicator is dedicated to indicating the time display mode.

10. The electronic watch according to claim 5, wherein the secondary hand of the second time indicating means is a GMT hand.

11. The electronic watch according to claim 5, wherein the first time and the second time correspond to times of two different time zones.

12. The electronic watch according to claim 11, comprising a date display configured to display the date in the time zone whose time is displayed by the main time indicating means.

13. The electronic watch according to claim 5, wherein the control member is a crown with at least two axial positions.

* * * * *